United States Patent
Eberius et al.

[11] Patent Number: 5,178,436
[45] Date of Patent: Jan. 12, 1993

[54] DRAFT DEFLECTOR FOR SLIDING ROOFS, REMOVABLE ROOF SECTIONS OR THE LIKE OF MOTOR VEHICLES

[75] Inventors: Jens Eberius, Ditzingen; Hans-Martin Gerhard, Ludwigsberg, both of Fed. Rep. of Germany

[73] Assignee: Dr. Ing. h.c.F. Porsche AG, Fed. Rep. of Germany

[21] Appl. No.: 762,660

[22] Filed: Sep. 18, 1991

Related U.S. Application Data

[63] Continuation of Ser. No. 590,818, Oct. 1, 1990, abandoned.

[30] Foreign Application Priority Data

Sep. 30, 1989 [DE] Fed. Rep. of Germany ....... 3932739

[51] Int. Cl.⁵ .............................................. B60J 7/22
[52] U.S. Cl. ................................. 296/217; 296/180.5
[58] Field of Search ........................... 296/180.5, 217; 98/2.14

[56] References Cited

U.S. PATENT DOCUMENTS

| | | | |
|---|---|---|---|
| 2,827,328 | 3/1958 | O'Kane et al. | 98/2.14 X |
| 2,987,979 | 6/1961 | Hezler, Jr. | 98/2.14 |
| 4,380,351 | 4/1983 | Sorensen et al. | 296/217 |
| 4,393,754 | 7/1983 | Hough et al. | 296/217 X |
| 4,492,406 | 1/1985 | Matsubara | 296/217 |

FOREIGN PATENT DOCUMENTS

| | | |
|---|---|---|
| 2339679 | 2/1975 | Fed. Rep. of Germany ...... 296/217 |
| 2339680 | 2/1975 | Fed. Rep. of Germany . |
| 3833046 | 4/1990 | Fed. Rep. of Germany ...... 296/107 |
| 3833865 | 4/1990 | Fed. Rep. of Germany ...... 296/217 |
| 0090433 | 4/1988 | Japan ................................... 296/217 |
| 0226426 | 9/1989 | Japan ................................... 296/217 |
| 2079697 | 1/1982 | United Kingdom . |
| 2157634 | 10/1985 | United Kingdom . |

Primary Examiner—Dennis H. Pedder
Attorney, Agent, or Firm—Evenson, Wands, Edwards, Lenahan & McKeown

[57] ABSTRACT

A draft deflector for a sliding roof is disclosed for a removable roof section or the like. The deflector exhibits an airfoil profile which extends in the transverse direction of the vehicle, is arranged adjacent to a front edge of the roof opening and can be moved from a sunk inoperative position to a swivelled-up operative position and vice versa. In the operative position, the airfoil profile extends at a negative setting angle and projects beyond an imaginary roof contour at least in sections in the upward direction. In order to reliably avoid, during the driving operation, when the roof is open, the occurrence of annoying low-frequency vibrations in the vehicle interior (sliding roof rumbling) and to essentially maintain the aerodynamic drag of the vehicle, it is provided that the airfoil profile, in the operative position, is arranged such that it is ensured that the air current occurring in the driving operation flows around the airfoil profile on both sides.

5 Claims, 2 Drawing Sheets

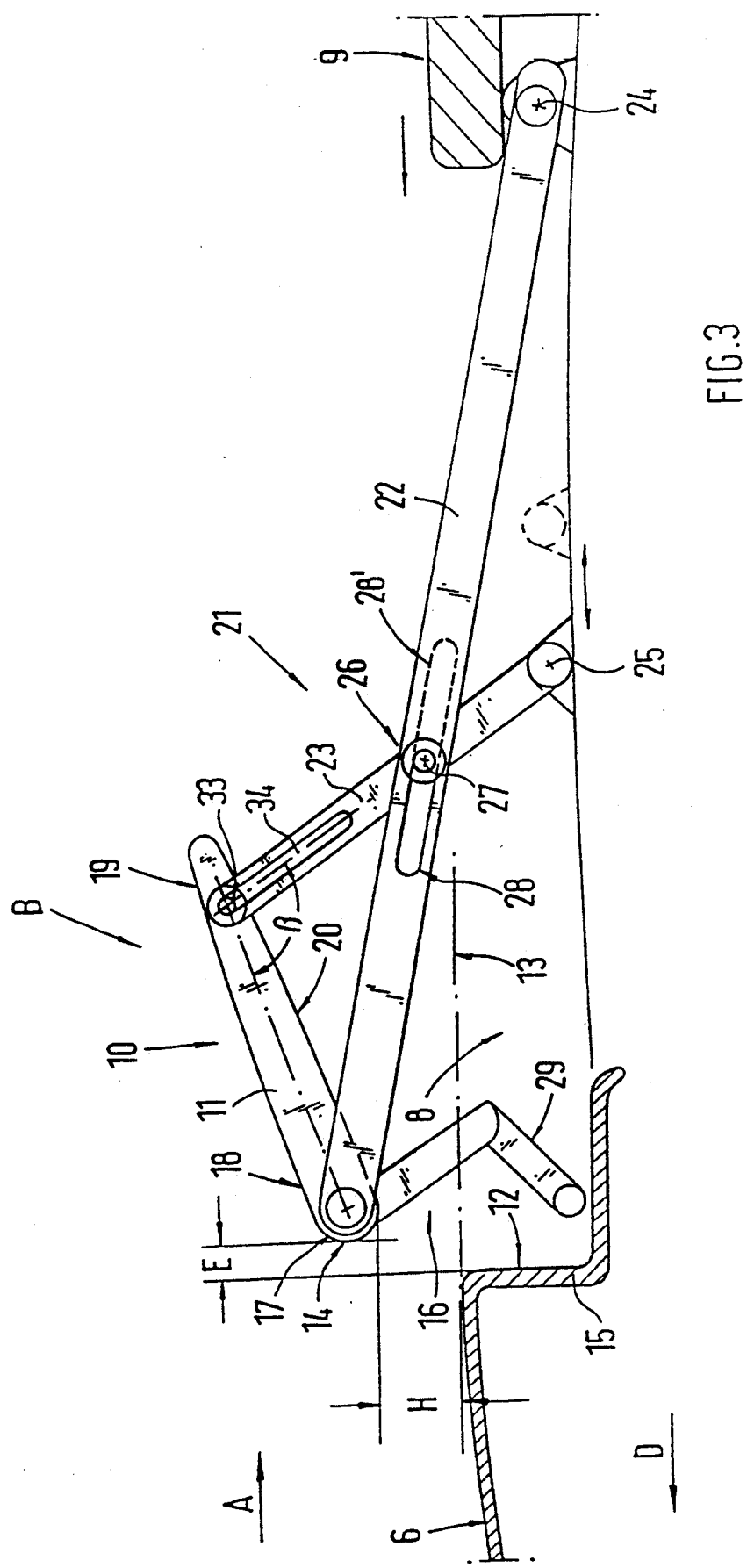

DRAFT DEFLECTOR FOR SLIDING ROOFS, REMOVABLE ROOF SECTIONS OR THE LIKE OF MOTOR VEHICLES

This is a continuation of application Ser. No. 07/590,818, filed Oct. 1, 1990, now abandoned.

BACKGROUND AND SUMMARY OF THE INVENTION

The invention relates to a draft deflector for sliding roofs, removable roof sections or the like of motor vehicles which is formed by an airfoil profile which extends in the transverse direction of the vehicle, is arranged adjacent to a front edge of a roof opening, and can be moved from a sunk inoperative position into a swivelled-up operative position and vice versa, with the airfoil profile projecting beyond an imaginary roof contour at least in sections in the upward direction.

Draft deflectors of this type have the purpose of reducing annoying wind noise occurring during the drive and of preventing the air located in the vehicle interior from carrying out low-frequency vibrations which are disagreeable to vehicle occupants (sliding roof rumbling). These vibrations are caused by the fact that the air flow guided over the vehicle roof breaks off at the front transversely extending edge of the roof opening or at the draft deflector and, mainly at a low driving speed, does not surmount the roof opening but flows into the vehicle interior disposed below it. However, at the same time, because of the increased flow rate above the roof opening, a vacuum is generated in the vehicle interior which endeavors to take in air from there. Both currents result in annoying whirls which form in a periodically alternating manner. As a result, a pulsating of the air column takes place in the vehicle interior, which close to the natural frequency leads to considerable nuisance (noise, pressure in the ears).

A known arrangement of the initially mentioned type disclosed in German Patent Document DE-AS 23 39 680 has a draft deflector for a sliding roof which is arranged adjacent to the transversely extending front edge of the roof opening and is pivoted in a groove below the roof opening. The draft deflector which is formed by an airfoil profile can be moved from a sunk inoperative position upward into a swivelled-up operative position and vice versa. In the operative position, the draft deflector extends at a negative setting angle and projects slightly beyond the roof contour in the upward direction. It is a disadvantage of this arrangement that, as a result of the slight projection of the draft deflector in the operative position, depending on the length of the roof opening, it may occur that despite the swivelled-up draft deflector, the air current guided over the vehicle roof does not completely surmount the roof opening and flows into the vehicle interior located below which results in the unpleasant sliding roof rumbling. Because of the low-lying position of the airfoil profile, the current only flows against its top side and the air current is therefore deflected upwards, whereas the bottom side of the airfoil profile remains without any function.

From the German Patent Document DE-OS 23 39 679, a draft deflector for a sliding roof is known that is formed by an airfoil profile, is arranged approximately in the area of half the opening length of the sliding roof, and extends at a negative setting angle. The transversely extending draft deflector extends completely above an imaginary roof contour, a front edge of the draft deflector extending approximately at the level of the imaginary roof contour.

Because of the position of the airfoil profile, in this case also, the air current passing the top side of the vehicle interacts only with the top side of the airfoil profile, whereas no flow takes place around the underside of the airfoil profile. It may occur in the case of this draft deflector arrangement that a partial area of the air current breaks off before it reaches the draft deflector and flows into the vehicle interior located underneath, resulting in annoying vibrations (sliding roof rumbling) in the interior of the vehicle. Fluidically, the cross-sectional surface of the airfoil profile which increases in the flow direction has the effect that the flow against the airfoil profile does not take place with little resistance and that the air current breaks off or swirls behind the airfoil profile. The arrangement of the draft deflector approximately in the area of half the opening length of the roof would only be suitable to a limited extent for a removable roof section because the draft deflector would always have to be taken off before the roof section is removed.

It is an object of the invention to take such measures on a motor vehicle having a sliding roof, a removable roof or the like and a draft deflector that in the driving operation, when the roof is open, the occurring of annoying vibrations in the vehicle interior (sliding roof rumbling) is reliably avoided and the aerodynamic drag of the vehicle is affected only insignificantly.

According to the invention, this object is achieved by providing an arrangement wherein the airfoil profile is arranged such that in its swivelled-up operative position, the air current occurring as a result of the driving operation flows around the airfoil profile on both sides.

The principal advantages achieved by means of the invention are that, because of the fact that the current flows around the airfoil profile on both sides, the current, in a forced manner, is neatly guided away over the roof opening without the penetration of any partial air current into the vehicle interior. The occurrence of annoying sympathetic vibrations (sliding roof rumbling) is reliably prevented, the noise level in the vehicle interior is clearly lower, and the aerodynamic drag is essentially maintained.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic longitudinal view of the roof of FIGS. 1 and 2 showing the adjusting mechanism for the draft deflector.

DETAILED DESCRIPTION OF THE DRAWINGS

Figure 1:
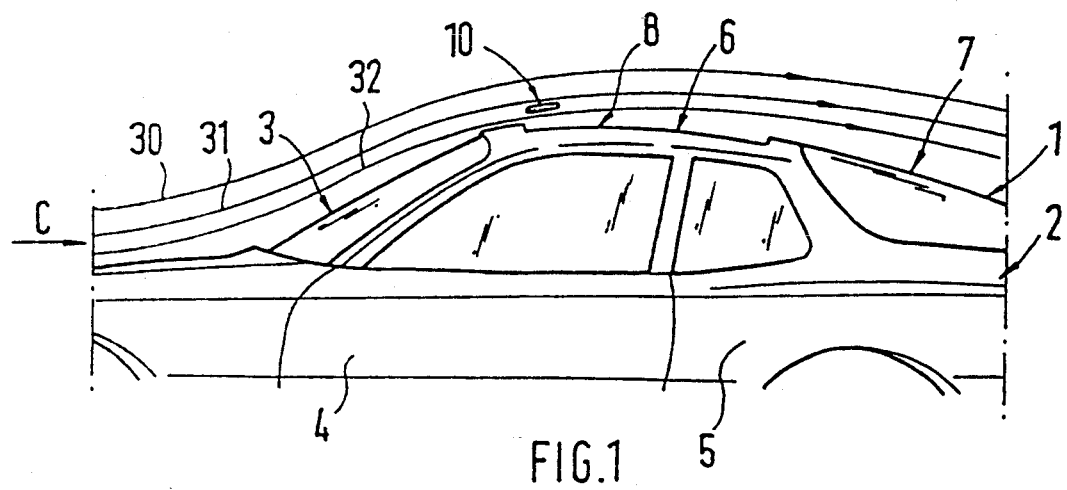
FIG. 1 is a schematic partial lateral view of a passenger car with an open roof section and a swivelled-up draft deflector situated in the operating position, constructed according to a preferred embodiment of the invention.

In the illustrated area, a motor vehicle 1 has a body 2 which comprises a windshield 3, a door 4, a rear side part 5, a roof 6, and a tail gate 7.

The motor vehicle 1, which is equipped with a sliding roof, a removable roof section or the like, has an approximately rectangular roof opening 8 which can be closed by a cover 9 or a sliding cover (FIG. 3).

For the reduction of the wind noise occurring during the drive as well as for avoiding the sliding roof rumbling (low-frequency vibrations in the vehicle interior), a draft deflector 10 is provided which is formed by an airfoil profile 11 extending in the transverse direction of the vehicle. The draft deflector 10 is arranged adjacent to a front edge 12 of the roof opening 8 and can be moved from a moved-in inoperative position, which is not shown, into an extended operative position B and vice versa.

In the operative position B, the airfoil profile 11 extends at a negative setting angle $\alpha$, the setting angle $\alpha$ being in the range between 0 and 30°.

According to the invention, the airfoil profile 11 in the operative position B is arranged above the roof 6 or the imaginary roof contour 13 so that the air current C occurring during the driving operation is forced to flow around the airfoil profile 11 on both sides.

According to FIG. 3, a front boundary edge 14 of the airfoil profile 11 in the operative position B extends, while it is slightly displaced toward the rear (measurement E), to a vertical flange 15 of the roof opening 8. The measurement E is a result of the circular movement of a lever 22. A gap 16 extends between the upper set airfoil profile 11 and the roof contour 13 disposed below it. Depending on the vehicle shape and the size of the roof opening 8, the clearance H of the gap 16 preferably amounts to approximately between 5 and 15 mm. The clearance H of the gap 16 is approximately constant along its whole transverse course.

The airfoil profile 11 is arranged in such a manner that, seen in the flow direction A, the cross-sectional surface of the airfoil profile 11 decreases. The thicker front end area 18 of the airfoil profile 11 equipped with a rounded projection 17 faces the front edge 12 of the roof opening 8. The rear area 19 of the airfoil profile 11 is set in the upward direction and has a larger distance to the imaginary roof contour 13 than the front end area 18.

The clearance H of the gap 16 and the setting $\alpha$ of the airfoil profile 11 depends on the vehicle shape and the size of the roof opening 8 and must be determined empirically for every vehicle.

By means of the arrangement of the airfoil profile 11 according to the invention, a current is intentionally generated at the underside 20 of the airfoil profile 11. The adjusted draft deflector 10 around which the current flows deflects the air current C so far in the upward direction that in interaction with the air portion flowing through under the airfoil profile 11, an entering of air into the roof opening 8 is avoided and, in contrast to the draft deflector 10 against which the current flows on one side, the aerodynamic coefficients remain low.

By means of the draft deflector 10 around which the current flows on both sides, a reduction of noise is achieved in the interior of the vehicle and low-frequency sympathetic vibrations are avoided while the aerodynamics of the vehicle are taken into account at the same time (only slightly rising drag coefficient in comparison to a closed roof; maintaining of a slight rear-axle lift because the current does not break off at the adjusted draft deflector).

For the movement of the draft deflector 10, an adjusting mechanism 21 is provided on both longitudinal sides of the roof opening 8. Each adjusting mechanism 21 comprises two levers 22, 23 which are arranged crosswise with respect to one another. The first lever 22 connects a front edge area 18 of the airfoil profile 11 with a roof-side linking point 24 which is disposed in the rear viewed in the driving direction. The second lever 23 extends between a rear area 19 of the airfoil profile 11 and a front roof-side linking point 25. The connection of the rear end area 19 with the lever 23 takes place by way of a set-off pin 33 of the draft deflector 10 or of the airfoil profile 11 which is slidably guided in a longitudinal slot guide 34 of the lever 23. In the crossing area 26, both levers 22, 23 are connected with one another, a set-off pin 27 of the second lever 23 interacting with a longitudinal slot guide 28 of the first lever 22.

In the operative position B, the airfoil profile 11 is disposed at an angle $\beta$ of $>90°$ (FIG. 3) with respect to the lever 23.

In a manner not shown in detail, the airfoil profile 11 and the levers 22, 23, by means of spring elements, such as coil springs, are automatically moved into the swivelled-up operative position B as soon as the sliding cover 9 is displaced toward the rear by a certain extent or when the cover is removed from the roof opening 8.

When the sliding cover 9 is moved toward the front, the draft deflector 10 is automatically moved into the sunk inoperative position by means of the interaction of the sliding cover 9 and the adjusting mechanism 21.

According to FIG. 3, a spring element 29 is provided in a central area of the transverse course of the airfoil profile 11 and causes an additional support of the airfoil profile 11 and cuts the free vibration length in half. A possible wobbling of the draft deflector 10, as a result of the arriving air current C, is counteracted.

There is the possibility that a profile may be used that is similar to an airfoil instead of an airfoil profile and that decreases continuously viewed in the flow direction A and has rounded front or rear edge areas.

Figure 2:
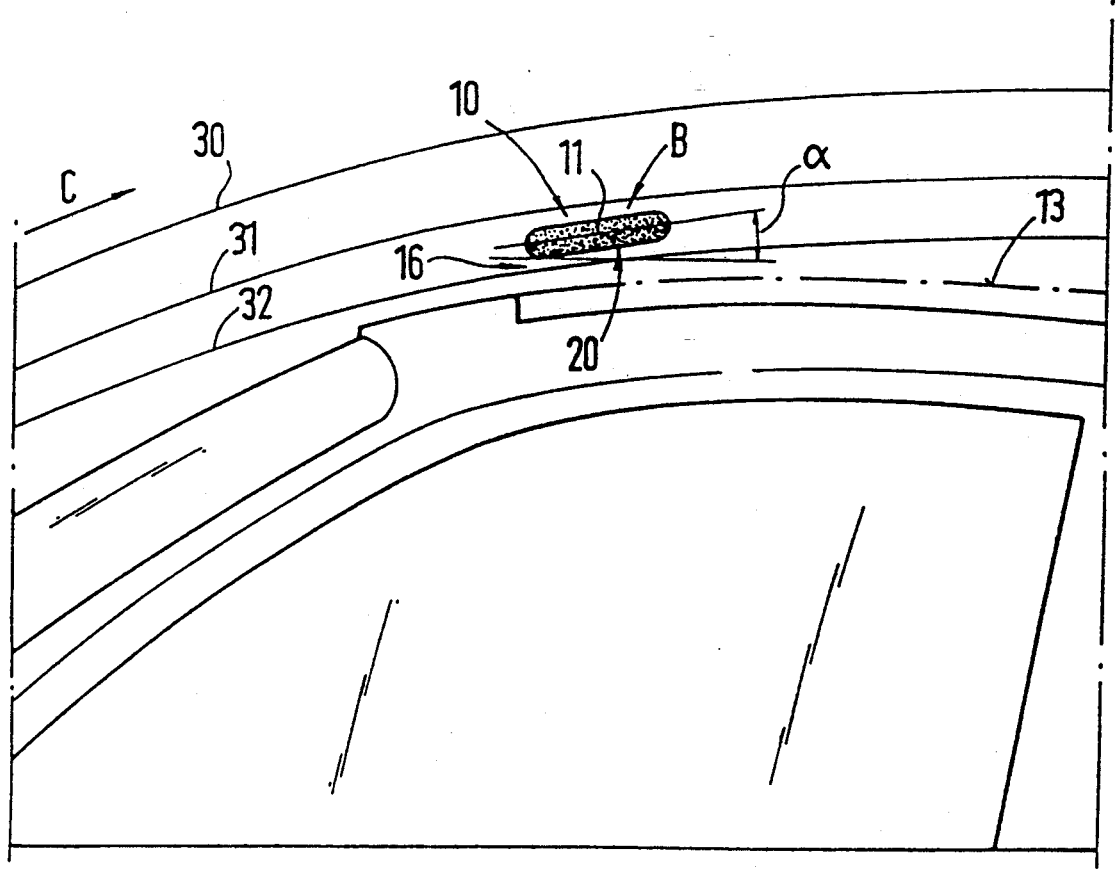
FIG. 2 is an enlarged view of detail X of FIG. 1.

FIGS. 1 and 2 show the flow around both sides of the airfoil profile 11, in which case the air current C passing the top side of the vehicle is represented by flow lines 30, 31 and 32. Flow line 32 shows the course of the flow under the airfoil profile 11, whereas flow lines 30, 31 indicate the flow over the airfoil profile 11.

It is possible to construct the rotatable linking point between the rear end area 19 and the lever 23 in a stationary manner. However, in that case, the body-side linking point 25 must be constructed to be displaceable in the longitudinal direction (illustrated by an interrupted line in FIG. 3) and, at the same time, the slot guide 28 in the lever 22 must take up the position 28' shown by an interrupted line.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A draft deflector movable between an inoperative position and an extended operative position for a motor vehicle having a roof contour, a front, and a rear, comprising:
    a roof opening, having a front edge, formed in the motor vehicle;
    an airfoil profile, having a front boundary edge, a top surface and a bottom surface, extending in a transverse direction of the motor vehicle and arranged adjacent to said front edge of said roof opening; and adjusting mechanisms arranged at both longitudinal sides of the opening, for moving the draft deflector from the operative position to the inoperative position;

wherein each adjusting mechanism has first and second levers which are arranged crosswise with respect to one another;

wherein, in the operative position, the first lever connects an end area of the draft deflector which is in the front viewed in the driving direction with a rear roof-side linking point, whereas the second lever extends between a rear end area of the draft deflector and a front roof-side linking point;

wherein both levers are in an operative connection in a crossing area in such a manner that a set-off pin of the second lever engages in a longitudinal slot guide of the first lever and is displaceably guided in it;

and wherein, when in the operative position, said airfoil profile forms an acute angle with respect to a horizontal plane and has a transverse cross-section spaced apart from and above the roof contour, said front boundary edge of said airfoil profile forming a gap having a height of approximately 5 to 15 mm with the roof contour, and being spaced rearward of said front edge of the roof opening, allowing air currents flowing around both the top and bottom surfaces of said airfoil profile to act upon the top and bottom surfaces forcing the air currents away from the roof opening.

2. A draft deflector according to claim 1, wherein the airfoil has a cross-sectional surface area, said cross-sectional surface area decreasing form the front to the rear of the motor vehicle.

3. A draft deflector according to claim 1, further comprising means for changing the height of the gap and the acute angle formed with the airfoil.

4. A draft deflector according to claim 1, wherein the connection of the rear end area of the draft deflector with the second lever takes place by way of a set-off pin at the draft deflector which is displaceably guided in a longitudinal slot guide of the second lever.

5. A draft deflector according to claim 1, wherein a spring element is provided in the center area of the transverse course of the airfoil profile and acts upon the airfoil profile in the direction of the swivelled-out operation position.

* * * * *